(12) United States Patent
Yoon et al.

(10) Patent No.: US 10,691,344 B2
(45) Date of Patent: Jun. 23, 2020

(54) SEPARATE MEMORY CONTROLLERS TO ACCESS DATA IN MEMORY

(71) Applicant: HEWLETT PACKARD ENTERPRISE DEVELOPMENT LP, Houston, TX (US)

(72) Inventors: Doe Hyun Yoon, Palo Alto, CA (US); Sheng Li, Palo Alto, CA (US); Jichuan Chang, Palo Alto, CA (US); Ke Chen, Palo Alto, CA (US); Parthasarathy Ranganathan, Palo Alto, CA (US); Norman Paul Jouppi, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 69 days.

(21) Appl. No.: 14/785,120

(22) PCT Filed: May 30, 2013

(86) PCT No.: PCT/US2013/043237
§ 371 (c)(1),
(2) Date: Oct. 16, 2015

(87) PCT Pub. No.: WO2014/193376
PCT Pub. Date: Dec. 4, 2014

(65) Prior Publication Data
US 2016/0070483 A1 Mar. 10, 2016

(51) Int. Cl.
*G06F 12/00* (2006.01)
*G06F 3/06* (2006.01)
(Continued)

(52) U.S. Cl.
CPC .......... *G06F 3/0611* (2013.01); *G06F 3/0646* (2013.01); *G06F 3/0683* (2013.01);
(Continued)

(58) Field of Classification Search
CPC .... G06F 3/0611; G06F 3/0646; G06F 3/0683; G06F 13/1636; G06F 23/1694
See application file for complete search history.

(56) References Cited

U.S. PATENT DOCUMENTS 5,581,727 A * 12/1996 Collins ............... G06F 12/0804
711/122
6,026,464 A 2/2000 Cohen
(Continued)

FOREIGN PATENT DOCUMENTS

CN 1489057 A 4/2004
CN 1495619 5/2004
(Continued)

OTHER PUBLICATIONS

Chen, et al., "MIMS: Towards a Message Interface based memory System" State Key Laboratory of Computer Architecture, Institute of Computing Technology, Chinese Academy of Sciences, Jan. 2013 (13 pages).
(Continued)

*Primary Examiner* — Ryan Bertram
*Assistant Examiner* — Trang K Ta
(74) *Attorney, Agent, or Firm* — Trop, Pruner & Hu, P.C.

(57) ABSTRACT

A first memory controller receives an access command from a second memory controller, where the access command is timing non-deterministic with respect to a timing specification of a memory. The first memory controller sends at least one access command signal corresponding to the access command to the memory, wherein the at least one access command signal complies with the timing specification. The first memory controller determines a latency of access of the memory. The first memory controller sends feedback information relating to the latency to the second memory controller.

20 Claims, 4 Drawing Sheets

(51) Int. Cl.
*G06F 13/16* (2006.01)
*G06F 13/42* (2006.01)

(52) U.S. Cl.
CPC ...... *G06F 13/1636* (2013.01); *G06F 13/1668* (2013.01); *G06F 13/1689* (2013.01); *G06F 13/1694* (2013.01); *G06F 13/4243* (2013.01)

(56) References Cited

U.S. PATENT DOCUMENTS

| | | | |
|---|---|---|---|
| 6,167,484 A * | 12/2000 | Boyer | G11C 7/24 365/222 |
| 6,195,303 B1 * | 2/2001 | Zheng | G11C 11/406 365/222 |
| 7,007,130 B1 * | 2/2006 | Holman | G06F 13/1668 711/104 |
| 7,966,439 B1 * | 6/2011 | Treichler | G06F 13/1689 710/306 |
| 8,291,295 B2 | 10/2012 | Harari | |
| 2002/0069319 A1 * | 6/2002 | Lee | G06F 13/1636 711/106 |
| 2004/0006674 A1 | 1/2004 | Hargis et al. | |
| 2004/0073765 A1 | 4/2004 | Arimilli et al. | |
| 2005/0102479 A1 | 5/2005 | Innan et al. | |
| 2005/0177690 A1 * | 8/2005 | LaBerge | G11C 5/00 711/154 |
| 2005/0235100 A1 * | 10/2005 | Sakurai | G06F 13/1636 711/106 |
| 2007/0033339 A1 * | 2/2007 | Best | G11C 11/406 711/106 |
| 2007/0058479 A1 * | 3/2007 | Matsui | G11C 7/1066 365/189.18 |
| 2009/0113158 A1 * | 4/2009 | Schnell | G06F 1/10 711/167 |
| 2010/0077140 A1 | 3/2010 | Abraham et al. | |
| 2011/0238941 A1 * | 9/2011 | Xu | G06F 13/1689 711/169 |
| 2011/0276972 A1 | 11/2011 | Chung | |
| 2012/0144105 A1 * | 6/2012 | Dodson | G11C 11/40603 711/106 |
| 2012/0246435 A1 * | 9/2012 | Meir | G06F 13/00 711/169 |
| 2012/0284454 A1 | 11/2012 | Klein | |
| 2013/0083611 A1 * | 4/2013 | Ware | G06F 1/3275 365/191 |
| 2013/0111113 A1 | 5/2013 | Harari et al. | |
| 2013/0111287 A1 | 5/2013 | Chao | |
| 2013/0151741 A1 * | 6/2013 | Walker | G06F 13/1626 710/110 |
| 2013/0282973 A1 * | 10/2013 | Kim | G11C 11/40622 711/106 |
| 2014/0059318 A1 * | 2/2014 | Uduebho | G11C 29/023 711/167 |
| 2014/0064096 A1 * | 3/2014 | Stevens | G06F 13/385 370/236 |
| 2014/0089576 A1 * | 3/2014 | Bains | G11C 16/00 711/106 |
| 2014/0237205 A1 * | 8/2014 | Takefman | H03M 13/05 711/162 |
| 2014/0281202 A1 * | 9/2014 | Hunter | G11C 11/40611 711/106 |

FOREIGN PATENT DOCUMENTS

| | | | | |
|---|---|---|---|---|
| CN | 1864140 A | 11/2006 | | |
| CN | 102483712 A | 5/2012 | | |
| CN | 102959525 A | 3/2013 | | |
| EP | 2280349 | 2/2011 | | |
| JP | 2002324397 A | * 11/2002 | ........... | G11C 11/406 |
| JP | 2010198171 A | 9/2010 | | |
| WO | WO-2006134550 A1 | 12/2006 | | |
| WO | WO-2014065774 | 5/2014 | | |
| WO | WO-2014065775 | 5/2014 | | |

OTHER PUBLICATIONS

Fang, et al., "Memory Architecture for Integrating Emerging Memory Technologies", 2011 International Conference on Parallel Architectures and Compilation Techniques, 2011 (10 pages).
Ghosh, et al., "Smart Refresh: An Enhanced Memory Controller Design for Reducing Energy in Conventional and 3D Die-Stacked DRAMs" School of Electrical and Computer Engineering, Georgia Institute of Technology, dated on or before May 1, 2013 (12 pages).
International Searching Authority, The International Search Report and the Written Opinion, dated Feb. 27, 2014, 9 Pages.
Jouppi, Norman Paul, International Appl. No. PCT/US13/33096, "Caching Data in a Memory System Having Memory Nodes at Different Hierarchical Levels" filed Mar. 20, 2013 (47 pages).
Loi, I. et al., An efficient distributed memory interface for Many-Core Platform with 3D stacked DRAM, (Research Paper), Mar. 8-12, 2010, 6 Pages.
Nguyen, Vincent, International Appl. No. PCT/US13/23743, "Runtime Backup of Data in a Memory Module" filed Jan. 30, 2013 (38 pages).
Udipi, et al., "Combining Memory and a Controller with Photonics through 3D-Stacking to Enable Scalable and Energy-Efficient Systems" University of Utah, HP Labs, Jun. 4-8, 2011 (12 pages).
Venugofal, Ravan V., U.S. Appl. No. 13/856,013, "Memory Module Having Multiple Memory Banks Selectively Connectable to a Local Memory Controller and an External Memory Controller" filed Apr. 3, 2013 (39 pages).
Yoon, et al., "Boom: Enabling Mobile Memory Based Low-Power Server DIMMs" Intelligent Infrastructure Lab (IIL)', Hewlett-Packard Labs, 2012 (26 pages).
Extended European Search Report dated Dec. 23, 2016 for EP Application No. 13885796.6; pp. 7.

* cited by examiner

SEPARATE MEMORY CONTROLLERS TO ACCESS DATA IN MEMORY

BACKGROUND

A memory controller is used for managing access of data in a memory. In some cases, the memory controller can be integrated into a processor. In such examples, the memory controller is referred to as a host-side memory controller. The host-side memory controller is used to perform various memory access functions, including address mapping, buffering and scheduling of commands, ordering of commands, and controlling of timing of signals to and from the memory.

The interconnect between the host-side memory controller and the memory is often bus-based, in which a memory bus is connected between the host-side memory controller and the memory. The memory controller acts as the master to orchestrate communication between the host-side memory controller and the memory.

BRIEF DESCRIPTION OF THE DRAWINGS

Some embodiments are described with respect to the following figures.

DETAILED DESCRIPTION

Using a host-side memory controller to control various memory operation and device management functions allows the memory to have a relatively simple configuration. The memory is configured such that the memory receives memory commands from the host-side memory controller, and responds to such memory commands. With the evolution of memory technology, operation and management of memory has become more complicated. For example, certain management tasks can be performed to achieve enhanced performance or improved power efficiency. Performing such management tasks at the host-side memory controller increases the burden on the memory controller, and can lead to increased communication overhead between the host-side memory controller and the memory.

Also, memories according to various different types of memory technologies are available, including a dynamic random access memory (DRAM), a non-volatile memory such as flash memory, a reduced latency DRAM (RL-DRAM), a hybrid memory cube (a memory package that has multiple memory and control logic dies arranged in a stack), a high-bandwidth memory, a mobile memory (such as a wide input/output memory or low-power double data rate or LPDDR memory), and so forth. Using a host-side memory controller to control memories according to different technologies can make the host-side memory controller more complicated.

A memory also has various timing parameters that specify constraints relating to timings of various different signals. The host-side memory controller would have to ensure that commands sent to the memory satisfy such timing parameters. For example, a first timing parameter can specify that not more than a predefined number of activate commands can be issued to a memory within a specified time interval. An example of such a timing parameter is a tFAW parameter for a DDR memory. A second timing parameter can specify that a minimum time lapse between activate commands to two rows in different banks of a memory. An example of such a timing parameter is a tRRD parameter for a DDR memory. These example timing parameters are used to provide power and thermal constraints for the memory.

Also, timing parameters can specify worst-case timings of signals that have to be satisfied to ensure proper memory operation. A worst-case timing of a signal can specify that a rising or trailing edge of the signal has to occur by a predefined maximum or minimum time. Although use of worst-case timing parameters can guarantee correctness and reduce complexity, they can come at the expense of reduced performance.

Implementing management tasks into a memory controller to address the foregoing issue can lead to increased complexity of the memory controller as well as to increased communication overhead between the memory controller and the memory.

Figure 1:
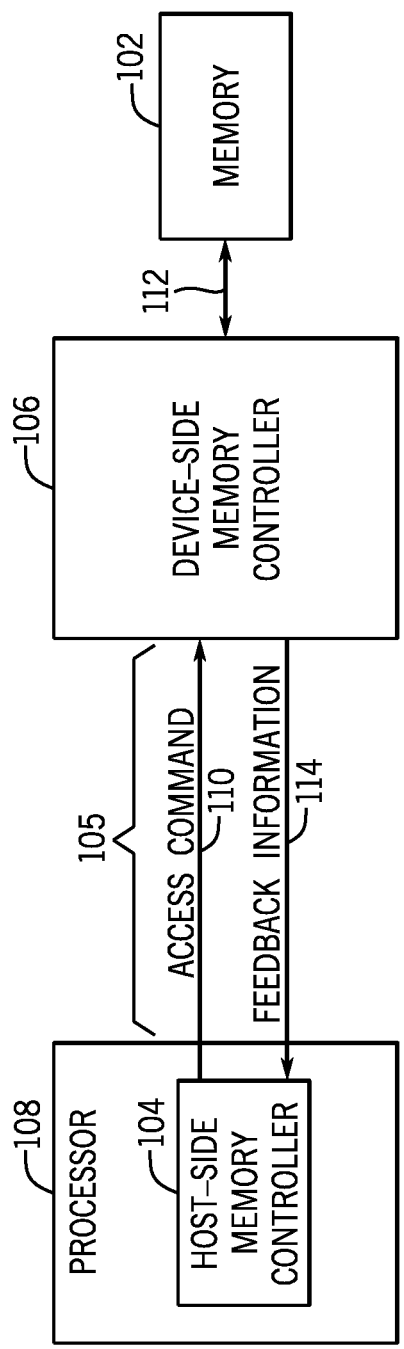
FIGS. 1-3 are block diagrams of example systems that incorporate various implementations.

As shown in FIG. 1, according to some implementations, decoupled memory controllers are provided for accessing data in a memory 102. The memory 102 can include one or multiple memory devices. The decoupled memory controllers include a host-side memory controller 104 and a device-side memory controller 106. The host-side memory controller 104 and the device-side memory controller 106 can be physically separate memory controllers that are included in separate integrated circuit packages (chips). Alternatively, the host-side memory controller 104 and the device-side memory controller 106 can be logically separate memory controllers that are included as part of the same physical package.

In examples according to FIG. 1, the host-side memory controller 104 is part of a processor 108. In other examples, the host-side memory controller 104 can be outside of the processor 108, but connected to the processor 108. In further different implementations, instead of the host-side memory controller 104 being associated with the processor 108, the host-side memory controller 104 can be associated with a different data requester, such as an input/output (I/O) device, or other requester.

The device-side memory controller 106 is coupled to the memory 102 over a memory interconnect 112 (e.g. bus, point-to-point link, or any other type of communication link or channel). In the ensuing discussion, reference is made to a memory bus 112; however, techniques or mechanisms according to some implementations can also be applied to other types of interconnects. In some examples, the device-side memory controller 106 and the memory 102 can be part of a memory module, such as a dual inline memory module (DIMM) or other type of memory module.

Different functionalities are provided in the host-side memory controller 104 and the device-side memory controller 106. The host-side memory controller 104 can manage the scheduling of memory requests (from the processor 108 or other data requester) according to priorities and/or quality-of-service (QoS) levels associated with the memory requests. Some memory requests (such as memory requests from certain applications or the operating system) may have a higher priority or may be assigned a greater QoS level than other memory requests. Memory request scheduling at the host-side memory controller 104 can cause memory requests with higher priorities or greater QoS levels to be scheduled ahead of other memory requests.

The device-side memory controller 106 can manage the timings of memory commands issued to the memory 102, to ensure that the memory commands (which include signals sent over the memory bus 112) satisfy various timing parameters. The device-side memory controller 106 also manages the ordering of execution of memory commands, such that the execution or results of the memory commands are in an order expected by the host-side memory controller 104. In other examples, the device-side memory controller 106 can also perform additional tasks, such as wear leveling to evenly distribute writes for certain types of non-volatile memory (e.g. flash memory), security tasks to protect data in the memory 102, garbage collection tasks to reclaim portions of the memory 102 that are no longer used, and/or other tasks.

An interface 105 is provided between the host-side memory controller 104 and the device-side memory controller 106. The interface 105 can be implemented as a bus or any other type of communication medium between the memory controllers 104 and 106. The host-side memory controller 104 can issue an access command 110 to the device-side memory controller 106 through the interface 105. The access command 110 is to access data (read data or write data) of the memory 102. In some implementations, the access command 110 sent from the host-side memory controller 104 to the device-side memory controller 106 is timing non-deterministic with respect to a timing specification of the memory 102. In other words, the access command 110 is issued by the host-side memory controller 104 without being constrained by the timing specification of the memory 102. The timing specification of the memory 102 is defined by the various timing parameters associated with the memory 102.

Instead, timing constraints of the timing specification of the memory 102 are handled by the device-side memory controller 106. The timing constraints govern the timing of signals on the memory bus 112 between the device-side memory controller 106 and the memory 102. As noted above, the timing constraints can include timing parameters of the memory 102 that have to be satisfied, where the timing parameters can indicate minimum or maximum times associated with various signals. Also, timing constraints (e.g. as specified by the tFAW and tRRD timing parameters discussed above) can be associated with power and thermal constraints of the memory 102.

A handshaking protocol can also be provided between the host-side memory controller 104 and the device-side memory controller 106, to allow the device-side memory controller 106 to provide feedback information 114, either through the interface 105 or other information channel, to the host-side memory controller 104 in response to the timing non-deterministic access command 110 from the host-side memory controller 104.

An example of the feedback information 114 can include a latency currently experienced by the device-side memory controller 106 in accessing the memory 102. The information pertaining to the latency experienced by the device-side memory controller 106 can be used by the host-side memory controller 104 in making scheduling decisions at the host-side memory controller 104.

Figure 2:
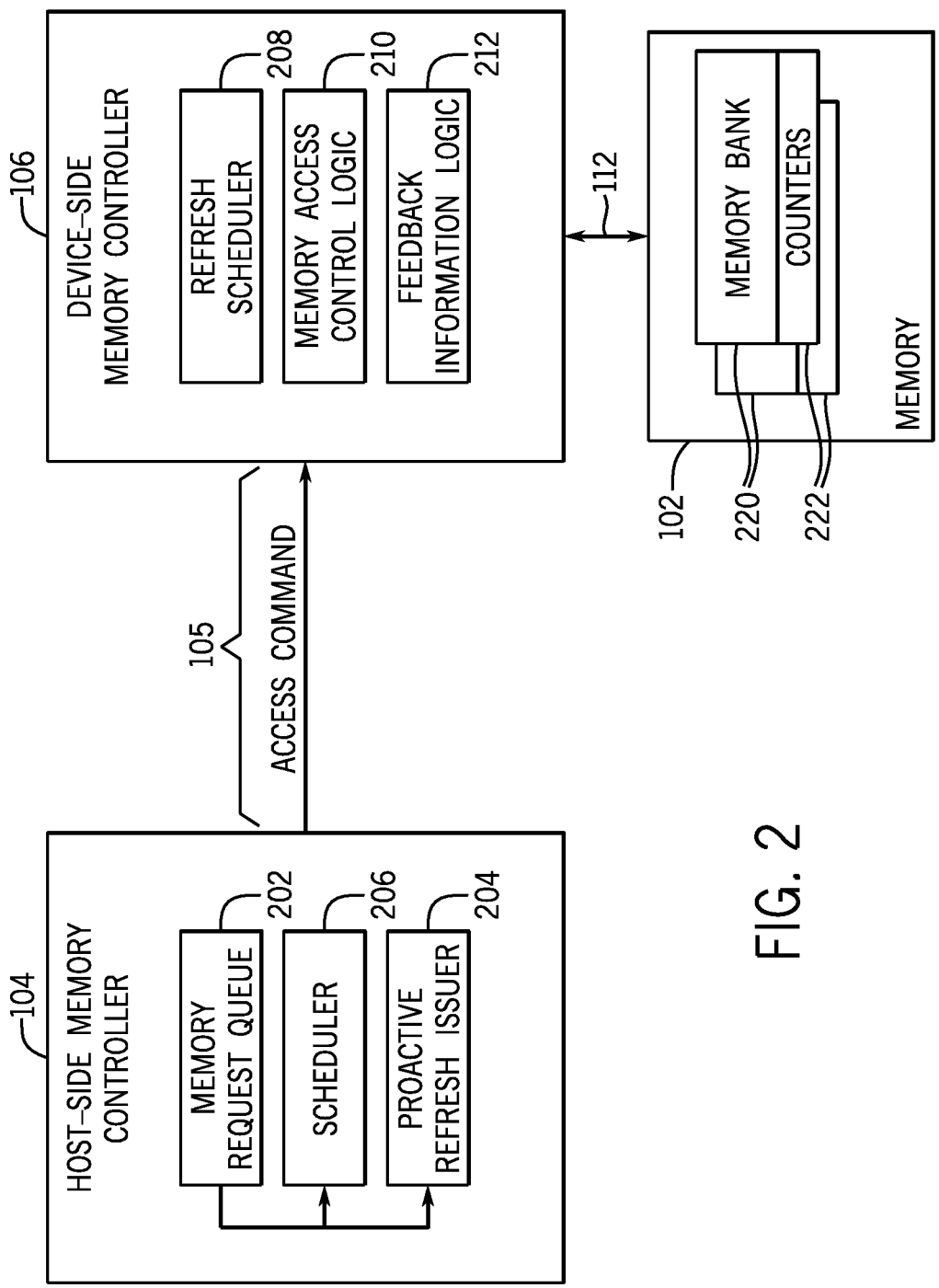

FIG. 2 is a block diagram of further details of the host-side memory controller 104 and the device-side memory controller 106. The host-side memory controller 104 includes a memory request queue 202 to store memory requests issued by the processor 108 or another data requester. The host-side memory controller 104 also includes a proactive refresh issuer 204 to issue refresh commands to the device-side memory controller 106. The host-side memory controller 104 also includes a scheduler 206, which schedules the transmission of access commands to the device-side memory controller 106 for memory requests in the memory request queue 202.

The device-side memory controller 106 includes a refresh scheduler 208, a memory access control logic 210, and a feedback information logic 212. The refresh scheduler 208 schedules the refresh of portions of the memory 102. The memory access control logic 210 controls the access of the memory in response to access commands received from the host-side memory controller 104. The feedback information logic 212 sends feedback information to the host-side memory controller 104.

In some examples where the memory 102 includes one or multiple DRAM devices, refresh operations are performed with respect to the memory 102. A DRAM device includes memory cells that store data using storage capacitors. Over time, the storage capacitors can lose charge, which can cause a memory cell to lose its data. To address this issue, a refresh operation can be performed to cause the charge in the storage capacitor to be restored to a level that corresponds to the data represented by the storage capacitor. A memory cell has to be refreshed at least once every minimum specified refresh time interval.

In some implementations, the proactive refresh issuer 204 of the host-side memory controller 104 can intelligently issue refresh commands to avoid interference with execution of access commands of the memory 102. For example, refresh commands can be scheduled to exploit idle time periods of the memory 102, such as in response to the proactive refresh issuer 204 detecting that the memory request queue 202 is empty.

After the proactive refresh issuer 204 has issued a refresh command to the device-side memory controller 106, when a new memory request arrives in the memory request queue 202 of the host-side memory controller 104, the proactive refresh issuer 204 can issue a refresh termination command to the device-side memory controller 106, to allow an access command (or multiple access commands) corresponding to the new memory request to be submitted to the device-side memory controller 106 to access data of the memory 102.

In response to a refresh command from the proactive refresh issuer 204, the refresh scheduler 208 can schedule refresh operations of portions of the memory 102. In some examples, the refresh scheduler 208 can sequentially perform refresh of successive rows of the memory 102, to ensure that each row is refreshed at least once per refresh time interval. The refresh scheduler 208 stops refresh operations in response to receiving a refresh termination command from the host-side memory controller 104.

Additionally, the refresh scheduler 208 of the device-side memory controller 106 can implement a technique to monitor the access history of portions of the memory 102, such as rows of the memory 102. The refresh scheduler 208 can skip the refresh of rows that were recently accessed (accessed within some past specified time period). Skipping the refresh of rows that were recently accessed reduces the number of refresh operations that have to be performed by the refresh scheduler 208.

To skip the refresh of recently accessed rows, access history can be recorded by per-row counters 222 in the memory 102. The counters 222 can be implemented in one or multiple rows of the memory 102. In the example of FIG. 2, the memory 102 includes multiple memory banks 220, where each memory bank 220 has corresponding counters 222. Each counter 222 counts a refresh time period for a respective row (or other portion of the memory 102).

In some implementations, the refresh scheduler 208 of the device-side memory controller 106 may modify the refresh frequency of its memory based on the specific process characteristics, voltage, and/or temperature of the attached memory devices, or based on knowledge of locations of high-leakage cells.

A counter 222 is reset whenever a corresponding memory row is accessed (by an access command such as a read command, write command, activate command, precharge command, etc.) or refreshed (due to a refresh operation scheduled by the refresh scheduler 208). In the present disclosure, an access operation of data of the memory 102 in response to an access command is considered different from a refresh operation performed in response to a refresh command.

After reset, a counter 222 starts counting (incrementing or decrementing). If the counter 222 expires, then that indicates that a refresh operation has to be performed with respect to the row. In response, the refresh scheduler 208 can issue a refresh command (referred to as an "auto-refresh command") to the memory 102.

As noted above, counters 222 are reset (updated) whenever an access or refresh is performed with respect to corresponding rows of the memory 102. An internal cache (not shown) can be provided in the device-side memory controller 106 to buffer the counter updates, which can reduce energy consumption and latency associated with lookups and updates of the counters 222.

Moreover, the device-side memory controller 106 can monitor its local address buffer (storing addresses for access commands) and only updates the respective counter 222 after all memory accesses to the same row are scheduled by the memory access control logic 210. This can further reduce counter updating overhead.

Access commands 110 that can be issued by the host-side memory controller 104 to the device-side memory controller 106 include an activate command and precharge command. Also, access commands 110 can include read and write commands.

The activate command is issued to the device-side memory controller 106 to cause the memory access control logic 210 of the device-side memory controller 106 to retrieve data of a row of memory cells in the memory 102 into a buffer (not shown) of the memory 102. Once data is retrieved into the buffer of the memory 102, the data in the buffer can be the target of a read operation or a write operation from the device-side memory controller 106.

Another access command 110 that can be issued is a precharge command. Precharging a row of the memory 102 causes the row to be closed, such that the data in the buffer of the memory 102 is written back to the row of memory cells in the memory 102.

The host-side memory controller 104 can assume that a majority of activate and precharge commands can be completed within a usual or expected latency (within a specified range of time for the memory 102), while a smaller portion of the activate and precharge commands may be associated with longer latencies (latencies that are longer than the specified range of time). The host-side memory controller 104 can make scheduling decisions based on the usual latency, but can adjust the scheduling when the device-side memory controller 106 notifies (using the feedback information 114) of any deviation from the usual latency.

In some examples, the interface 105 between the host-side memory controller 104 and the device-side memory controller 106 has just one master, which is the host-side memory controller 104. As a result, the device-side memory controller 106 would not be able to initiate the sending of a notification to the host-side memory controller 104. To address this issue, the scheduler 206 of the host-side memory controller 104 can issue a dummy access command to the device-side memory controller 106, where the dummy access command causes the device-side memory controller 106 to respond with information, including the feedback information 114. For example, the dummy access command can be a dummy read command.

In some examples, after a timing non-deterministic activate or precharge command is sent from the host-side memory controller 104 to the device-side memory controller 106, the host-side memory controller 104 can issue a dummy read command to the device-side memory controller 106. In some examples, the dummy read command can be sent to a reserved address, where the reserved address indicates that the read command is a dummy read command (as opposed to an actual read command to read data stored in the memory 102).

In response to the dummy read command, the feedback information logic 212 of the device-side memory controller 106 can respond with information indicating an estimated latency, which can be the usual (expected) latency or a larger latency. The latency information can be included in a data packet sent from the device-side memory controller 106 to the host-side memory controller 104 that is responsive to the dummy read command. The latency information provided to the host-side memory controller 106 provides status information relating to timing non-deterministic access commands issued by the host-side memory controller 104.

The host-side memory controller 104 can use the latency information provided by the device-side memory controller 106 to adjust scheduling by the scheduler 206. If the latency information indicates that latency of the device-side memory controller 106 is greater than the usual latency, then the scheduler 206 at the host-side memory controller 104 can adjust its scheduling, such as by delaying further transmissions of access commands to the device-side memory controller 106.

In other examples, instead of using a dummy access command, the interface 105 can be configured with dedicated handshaking signaling channels to allow the device-side memory controller 106 to send the feedback information 114 to the host-side memory controller 104.

The device-side memory controller 106 is also configured to honor the order of access commands 110 received from the host-side memory controller 104, to ensure data correctness and to ensure that a data requester is provided with an expected QoS. In some examples, the memory access control logic 210 of the device-side memory controller 106 can schedule access commands according to the order received from the host-side memory controller 104.

In alternative implementations, the memory access control logic 210 can perform optimization by using out-of-order scheduling, in which access commands received from the host-side memory controller 104 can be scheduled by the memory access control logic 210 out of order with respect to the order of access commands 110 received from the scheduler 206 of the host-side memory controller 104. If out-of-order scheduling is performed by the memory access control logic 210, then intermediate data received from the memory 102 can be buffered in the device-side memory controller 106. The buffered intermediate data can be used to send responsive data back to the host-side memory controller 104 in an order according to which data was requested by the host-side memory controller 104. Alternatively, data may be returned out of order identified by ordering tags.

Figure 3:
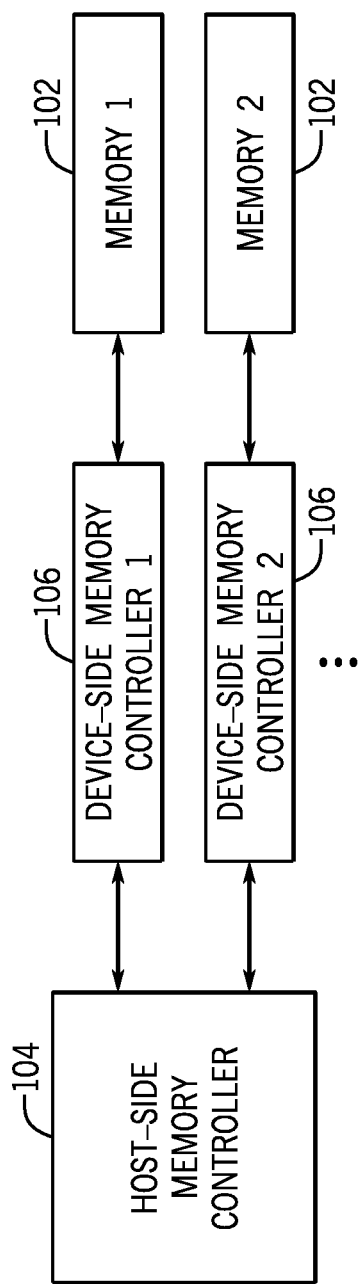

In alternative implementations, as depicted in FIG. 3, the host-side memory controller 104 can interact with a number of device-side memory controllers 106. The multiple device-side memory controllers 106 can support respective memories 102 of different technologies. In this way, the host-side memory controller 104 can be simplified to avoid having to address constraints and features of different memory technologies. Instead, the different device-side memory controllers 106 are configured to handle the various constraints and features of the different memory technologies.

In further implementations, the host-side memory controller 104 can work with either a memory or a device-side memory controller. If the host-side memory controller 104 is to work with a memory, such as memory 102, then the host-side memory controller 104 functions as a legacy memory controller. On the other hand, if the host-side memory controller 104 is coupled to a device-side memory controller 106, then the host-side memory controller 104 operates according to implementations of the present disclosure. The host-side memory controller 104 can be configured at system initialization to work either with a memory or with a device-side memory controller.

Figure 4:
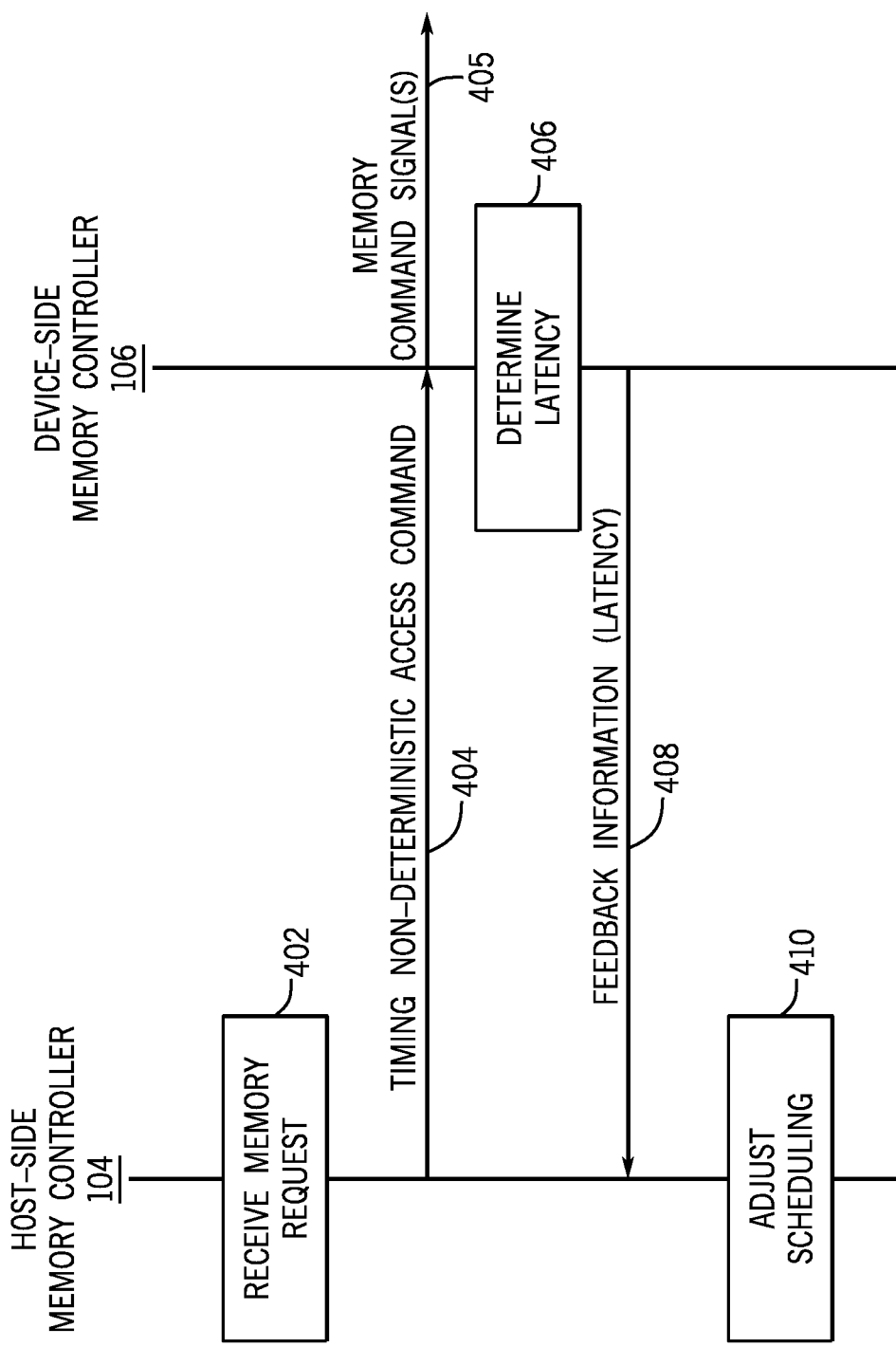
FIG. 4 is a flow diagram of a memory access process according to some implementations.

FIG. 4 is a flow diagram of a memory access process according to some implementations. The host-side memory controller 104 receives (at 402) a memory request from a data requester (e.g. processor 108 or other requester). The host-side memory controller 104 sends (at 404) a timing non-deterministic access command corresponding to the received memory request to the device-side memory controller 106.

Upon receiving the timing non-deterministic access command from the host-side memory controller 104, the memory access control logic 210 of the device-side memory controller 106 sends (at 405) corresponding memory command signal(s) to the memory 102. The memory command signal(s) satisfy the timing specification (as specified by the timing parameters) of the memory 102.

The device-side memory controller 106 also determines (at 406) a latency associated with processing the received access command. The device-side memory controller 106 can determine whether the latency is a usual latency, or is greater than the usual latency. In response to the determined latency, the feedback information logic 212 of the device-side memory controller 106 can send (at 408) latency information back to the host-side memory controller 104. Note that the latency information can be sent back to the host-side memory controller 104 in a data packet that is responsive to a dummy read command from the host-side memory controller 104. Alternatively, the latency information can be sent back over a handshaking signaling channel between the memory controllers 104 and 106.

The host-side memory controller 104 can then adjust (at 410) scheduling of access commands based on the feedback information containing the latency information.

By using decoupled memory controllers according to some implementations, the host-side memory controller can be made less complex, since some memory-specific management tasks are performed at the device-side memory controller. Feedback information responsive to timing non-deterministic access commands can be provided from the device-side memory controller to the host-side memory controller, to allow the host-side memory controller to make scheduling adjustments as appropriate. Also, cooperation can be performed between the host-side and device-side memory controllers for more efficiently performing memory refresh operations.

Various tasks of the host-side and device-side memory controllers can be performed using hardware or a combination of hardware and machine-readable instructions. Machine-readable instructions can be executed by processing circuitry of the respective memory controller.

The machine-readable instructions can be stored in one or multiple computer-readable or machine-readable storage media. The storage media include different forms of memory including semiconductor memory devices such as DRAMs, erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A system comprising:
    a memory;
    a first memory controller coupled to the memory;
    a second memory controller separate from the first memory controller, the second memory controller to send at least one access command to the first memory controller, the at least one access command to read or write data of the memory and being timing non-deterministic with respect to a timing specification of the memory,
    wherein the first memory controller is responsive to the at least one access command to issue at least one command signal to the memory, the at least one command signal satisfying the timing specification of the memory,
    wherein the first memory controller is to notify the second memory controller regarding a latency associated with accessing the memory,
    wherein the second memory controller is to issue a refresh command to the first memory controller in response to the second memory controller detecting an idle period of the second memory controller,
    wherein the memory comprises one or more memory types and the first memory controller comprises one or more separate memory controllers, each memory of the one or more memory types corresponds to each separate memory controller of the first memory controller, respectively; and
    wherein the timing specification of the memory relates to a timing parameter associated with a power constraint and a timing parameter associated with a thermal constraint of each memory of the one or more memory types.

2. The system of claim 1, wherein the second memory controller is to detect the idle period of the second memory controller in response to detecting that a memory request queue of the second memory controller is empty, and the second memory controller is to issue the refresh command to the first memory controller in response to the second memory controller detecting that the memory request queue is empty.

3. The system of claim 1, wherein the second memory controller is to issue a precharge command to the first memory controller to precharge a portion of the memory.

4. The system of claim 1, wherein the first memory controller is to send information regarding the latency in a data packet responsive to a dummy access command from the second memory controller.

5. The system of claim 1, wherein the first memory controller is to send information regarding the latency over a handshaking signal channel between the first and second memory controllers.

6. The system of claim 1, wherein the second memory controller is to adjust scheduling of access commands for accessing data of the memory, the adjusting being responsive to the latency.

7. The system of claim 1, wherein the first memory controller is to manage ordering of responses to access commands from the second memory controller, the ordering being according to an order of the access commands received from the second memory controller.

8. The system of claim 1, wherein the first memory controller is to monitor an access history of the memory, and to skip portions of the memory to refresh based on the monitored access history.

9. The system of claim 1, wherein the second memory controller is to issue a refresh termination command to the first memory controller in response to the second memory controller receiving a new memory request.

10. The system of claim 9, wherein the first memory controller is responsive to the refresh command to schedule a refresh operation of a portion of the memory.

11. The system of claim 10, wherein the first memory controller is to stop the refresh operation of the memory in response to receiving the refresh termination command.

12. The system of claim 1, further comprising a processor, wherein the second memory controller is part of the processor.

13. The system of claim 12, further comprising a memory module including the first memory controller, the memory, and a memory interconnect that connects the first memory controller and the memory, wherein the second memory controller is outside of the memory module.

14. The system of claim 1, further comprising the second memory controller to send the at least one access command to a separate memory controller of the first memory controller coupled to a non-volatile memory type and the second memory controller to send the at least one access command to a separate memory controller of the first memory controller coupled to a volatile memory type.

15. A method comprising:
receiving, by a device-side memory controller, at least one access command from a host-side memory controller, wherein the at least one access command is timing non-deterministic with respect to a timing specification of a memory;
sending, by the device-side memory controller, at least one access command signal corresponding to the at least one access command to the memory, wherein the at least one access command signal complies with the timing specification;
determining, by the device-side memory controller, a latency of access of the memory;
sending, by the device-side memory controller, feedback information relating to the latency to the host-side memory controller;
receiving, by the device-side memory controller, a refresh command issued by the host-side memory controller responsive to the host-side memory controller detecting an idle period of the host-side memory controller; and
in response to the refresh command, performing, by the device-side memory controller, a refresh operation of the memory;
wherein the memory comprises one or more memory types and the first memory controller comprises one or more separate memory controllers, each memory of the one or more memory types corresponding to each separate memory controller of the first memory controller, respectively; and
wherein the timing specification relates to a timing parameter associated with a power constraint and a timing parameter associated with a thermal constraint of each memory of the one or more memory types.

16. The method of claim 15, wherein the host-side memory controller is part of a processor.

17. The method of claim 15, further comprising:
receiving, by the host-side memory controller, a memory request from a data requester; and
in response to the memory request, sending, by the host-side memory controller, the access command to the device-side memory controller.

18. The method of claim 17, further comprising:
adjusting, by the host-side memory controller, scheduling of access commands based on the latency indicated by the feedback information, the adjusting of the scheduling of the access commands based on the latency comprising delaying a transmission of an access command from the host-side memory controller to the device-side memory controller in response to the latency indicated by the feedback information.

19. The method of claim 15, further comprising:
receiving, by the device-side memory controller, a refresh termination command from the host-side memory controller; and
stopping, by the device-side memory controller, the refresh operation in response to the refresh termination command.

20. An article comprising at least one non-transitory machine-readable storage medium storing instructions that upon execution cause a first memory controller to:
receive a memory request from a data requester;
send at least one access command to a second memory controller, the at least one access command being timing non-deterministic with respect to a timing specification of a memory, and wherein the at least one access command is to cause the second memory controller to issue at least one access command signal to the memory that satisfies a timing constraint of the timing specification, the timing constraint governing a timing of the access command signal on a memory bus between the second memory controller and the memory;
receive, from the second memory controller, information relating to a latency of accessing the memory; and issue a refresh command to the second memory controller in response to detecting an idle period of the first memory controller, the refresh command to cause the second memory controller to schedule refresh operations of portions of the memory;

wherein the memory comprises one or more memory types and the first memory controller comprises one or more separate memory controllers, each memory of the one or more memory types corresponds to each separate memory controller of the first memory controller, respectively; and wherein the timing specification relates to a timing parameter associated with a power constraint and a timing parameter associated with a thermal constraint of each memory of the one or more memory types.

* * * * *